United States Patent
Kato

(10) Patent No.: US 7,538,331 B2
(45) Date of Patent: May 26, 2009

(54) RADIATION IMAGE CONVERSION PANEL

(75) Inventor: Munetaka Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 174 days.

(21) Appl. No.: 11/400,333

(22) Filed: Apr. 10, 2006

(65) Prior Publication Data

US 2006/0249691 A1    Nov. 9, 2006

(30) Foreign Application Priority Data

Apr. 8, 2005    (JP) .............................. 2005-112301

(51) Int. Cl.
*G03B 42/08* (2006.01)
(52) U.S. Cl. .................................. 250/484.4
(58) Field of Classification Search ............... 250/484.4
See application file for complete search history.

(56) References Cited

U.S. PATENT DOCUMENTS 6,313,472 B1    11/2001  Nakajo

2003/0155529 A1 *   8/2003  Morikawa et al. ........ 250/484.4
2003/0189179 A1 *  10/2003  Leblans et al. .......... 250/484.4
2005/0133731 A1 *   6/2005  Matsumoto et al. ...... 250/484.4

FOREIGN PATENT DOCUMENTS

| JP | 2000-122194 A | 4/2000 |
| JP | 2002-285148 A | 10/2002 |
| JP | 2005-266526 A | 9/2005 |

\* cited by examiner

*Primary Examiner*—David P Porta
*Assistant Examiner*—Mark R Gaworecki
(74) *Attorney, Agent, or Firm*—Sughrue Mion, PLLC

(57) ABSTRACT

A radiation image conversion panel includes a substrate and a phosphor layer formed on the substrate by a vapor-phase deposition method. The phosphor layer has a columnar crystal structure and the columnar crystal structure accounts for 50 to 65% of the phosphor layer in terms of relative density. The panel requires a smaller quantity of erasing light and hence is suitable for application in a small type of radiation image information recording and reading apparatus.

4 Claims, 1 Drawing Sheet

RADIATION IMAGE CONVERSION PANEL

The entire contents of documents cited in this specification are incorporated herein by reference.

FIELD OF THE INVENTION

The present invention relates to a radiation image conversion panel that may be used in medical diagnostic systems and the like. More particularly, the invention relates to a radiation image conversion panel that permits efficient erasing of energy that remains after the stored radiation image has been read out.

BACKGROUND OF THE INVENTION

In medical diagnostic systems that use a radiation image conversion panel, the radiation image information about a subject such as the human body is first recorded on a stimulable phosphor and then either reproduced on a light-sensitive material (e.g. a photographic film) and the like or output as a visible image to a variety of display means.

The stimulable phosphor used in the medical diagnostic systems is a phosphor which, upon exposure to a radiation (e.g. X-rays, $\alpha$-rays, $\gamma$-rays, electron beams or UV light), stores part of its energy and which, when later irradiated with exciting light such as visible light, emits a quantity of photostimulated luminescence that depends on the stored energy. For various reasons such as the ease of handling, the stimulable phosphor is typically used in the form of a panel comprising a support and a layer of the stimulable phosphor provided on it (namely, in the form of a radiation image conversion panel); the panel is commonly called an imaging plate (hereinafter sometimes abbreviated as IP).

The IP is used in a radiation image information recording and reading apparatus (which is hereunder referred to simply as an apparatus); this apparatus is typically an integral assemblage of an imaging unit which records radiation image information about a subject on the IP, a reading unit which applies exciting light to the IP having the radiation image information recorded thereon so as to photoelectrically read the radiation image information, and an erasing unit which removes the radiation image information that remains on the IP after the reading step.

The apparatus may adopt either a "cassette system" using the IP as it is accommodated in a cassette or a "built-in system" using the IP continuously in the system. The two systems are basically different in the number of IPs used: in the former system, a multiple of IPs are used sequentially whereas in the latter, only a few (mostly one or two) IPs are frequently used.

The essential part of a built-in apparatus may be found in JP 2000-122194 A; in FIGS. 2 and 3 accompanying that patent, a type of using two IPs is shown, and a type of using a single IP is shown in FIG. 4. Both types of apparatus are designed for surface reading, or reading information from the plane on which the radiation is incident.

JP 2002-285148 A gives a full account of the stimulable phosphor described above, and radiation image conversion panels (IPs as referred to in the specification of the subject application) that are fabricated by coating a variety of supports with that stimulable phosphor, as well as a method of recording radiation image using the panel. The structural design of the apparatus is not particularly specified in this patent.

When one attempts to improve the apparatus of the aforementioned built-in system by realizing smaller size, easy maintenance and convenient use, the following points should be considered.

For ultimate size reduction, it is preferred to use only a single IP. Needless to say, a design that satisfies this need repeats the cycle of the following steps: recording radiation image on a single IP, reading the information about the recorded radiation image, erasing the information about the radiation image that remains after the reading step, and using the IP again.

This design requires the IP to have a certain characteristic that may be called "suitability for repeated use". This is none other than a characteristic of the stimulable phosphor used in the IP. To be more specific, when the apparatus is designed to use only one IP for the purpose of size reduction, one and the same IP shall be used repeatedly over a specified period of time, so it must be chosen to meet the requirement for sufficient durability.

The IP design factor that should be considered here is that it takes only a short time to erase the radiation image information on the IP after the reading step (this requirement is hereinafter described as "good erasure characteristic"). When one adopts the above-described process in which the cycle of recording radiation image information on a single IP, and reading and erasing the information is repeated within a short period of time, good erasure characteristic is important for the purpose of shortening the cycle time.

In previously filed and commonly assigned Japanese Patent Application No. 2004-81010 (JP 2005-266526 A) for "a radiation image information recording and reading apparatus", is proposed an IP using a stimulable phosphor with good erasure characteristic, as well as a radiation image information recording and reading apparatus that employs the IP.

The stimulable phosphor used in that IP (and shown in the Examples) has the composition $BaFBr_{0.85}I_{0.15}$:Eu and, compared with two other stimulable phosphors in common use (BaFI:Eu and CsBr:Eu), this phosphor shows outstanding performance in such characteristics as the required quantity of erasing light and the required quantity of residual image erasing light (the "required quantity of residual image erasing light" means the luminescence measured in the same manner as in the quantity of erasing light after a predetermined period of time has passed from the light erasure).

SUMMARY OF THE INVENTION

An object, therefore, of the present invention is to provide an IP (radiation image conversion panel) that requires a smaller quantity of erasing light and which hence is suitable for application in the aforementioned small type of radiation image information recording and reading apparatus.

More specifically, the present invention has as its objective providing an IP having good erasure characteristic in that the residual radiation information can be erased with a smaller quantity of erasing light in a shorter period of time and at lower cost.

To attain the stated object, the present invention provides a radiation image conversion panel comprising: a substrate; and a phosphor layer formed on said substrate by a vapor-phase deposition method, wherein said phosphor layer has a columnar crystal structure and said columnar crystal structure accounts for 50 to 65% of said phosphor layer in terms of relative density.

The term "relative density (%)" as used herein means the density of the phosphor layer relative to the inherent density of the phosphor.

Stated specifically, if the weight as the product of the volume occupied by the phosphor layer (including voids) and the inherent density of the phosphor is written as M1 (g) and the actual weight of the phosphor layer as M2 (g) (which can be measured by, for example, actually scraping off the phosphor layer), the relative density (%) is determined by the formula M2/M1×100.

In the radiation image conversion panel according to the present invention, the phosphor layer is preferably formed of an alkali metal halide based stimulable phosphor; and preferably, the alkali metal halide based stimulable phosphor is a cesium halide based stimulable phosphor.

The present invention offers a significant advantage in that it can realize an IP that is highly adaptive to repeated use and which hence is suitable for application in a small-size radiation image information recording and reading apparatus.

To be more specific, the IP (radiation image conversion panel) of the present invention has good erasure characteristic, so it offers a marked advantage in that the energy remaining in the IP that has passed through a cycle of recording and reading steps can be erased with a small enough quantity of erasing light in a shorter period of time and at lower cost.

DETAILED DESCRIPTION OF THE INVETNION

Figure 1:
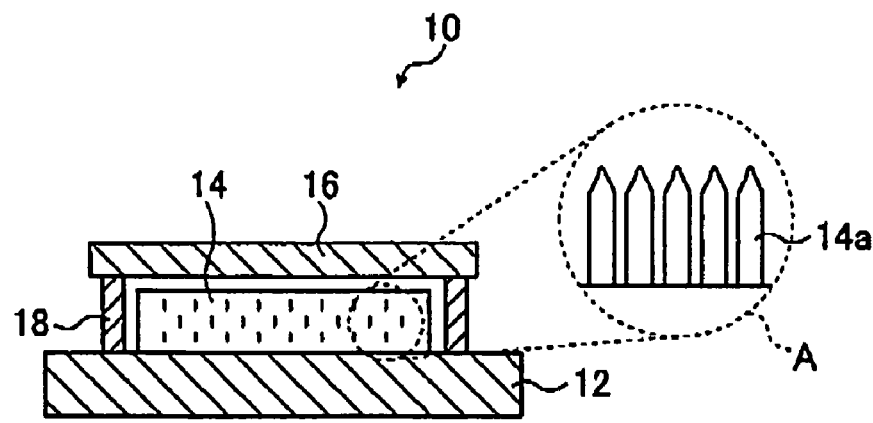
FIG. 1 shows schematically an IP according to an embodiment of the present invention.

The present invention is described below in detail with reference to the preferred embodiment shown in the drawings.

FIG. 1 is a schematic representation of a radiation image conversion panel (hereinafter abbreviated as IP) 10 according to an embodiment of the present invention, which uses CsBr:Eu as a stimulable phosphor.

In FIG. 1, numeral 12 refers to a substrate, 14 a vapor-deposited phosphor layer, 16 a protective layer, and 18 a frame.

The IP 10 shown in FIG. 1 has the vapor-deposited tabular phosphor layer 14 formed on the central portion of the tabular substrate 12. The frame 18 is formed on the substrate 12 so as to surround the phosphor layer 14. The frame 18 formed on the substrate 12 on the periphery of the phosphor layer 14 has a larger height than the thickness of the phosphor layer 14. The protective layer 16 is formed on the frame 18 so as to seal the vapor-deposited-phosphor layer 14 therewith.

Inset A in FIG. 1 is an enlarged view of the phosphor layer 14. As shown in the insert, the phosphor layer 14 is formed as an assemblage of a large number of columnar crystals 14a. The columnar crystals 14a are generally cylindrical and their size (diameter) ranges from several micrometers to ten-odd micrometers. As is obvious from the inset A, the top of each columnar crystal 14 often protrudes in the center.

By controlling the conditions of evaporation, the columnar crystals 14a can be grown in such a way that gaps will remain in the phosphor layer 14. By adjusting the relative density of the phosphor layer with such gaps taken into account, various characteristics of the phosphor layer 14 can be controlled.

Figure 2:
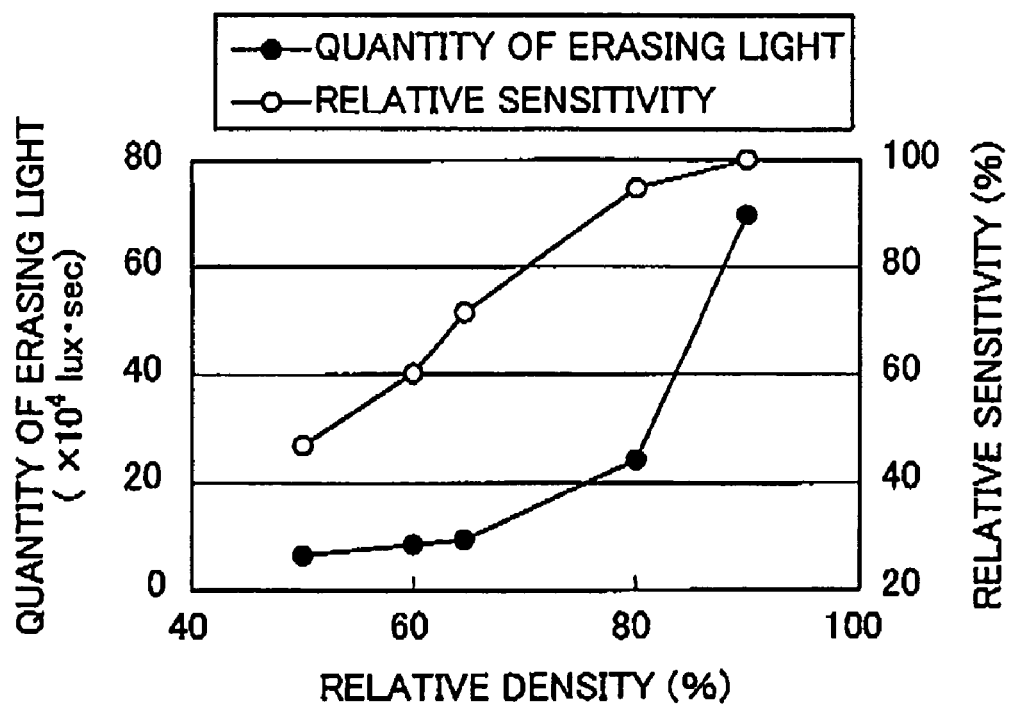
FIG. 2 is a graph showing how the relative sensitivity and the required quantity of erasing light are related to the relative density of the phosphor layer in one example of the present invention.

Take, for example, the case shown in FIG. 2 which is a graphic representation of two characteristic factors (relative sensitivity and the required quantity of erasing light) of the phosphor layer 14 for relative densities over the range of 50% to 90%.

As is clear from FIG. 2, the relative sensitivity of the phosphor layer 14 tends to decrease with the decreasing relative density; this is probably due to the decrease in the total amount of the phosphor that absorbs X-rays. The required quantity of erasing light also tends to decrease with the decreasing relative density and this is probably because the gaps between the columnar crystals 14a contribute to enhancing the efficiency of utilization of the erasing light.

FIG. 2 shows a profile of the quantity of erasing light required by the phosphor layer as its relative density varies. The data was obtained for plural samples of the phosphor layer having different relative densities by measuring the quantity of erasing light that was required by each sample until the afterglow (the quantity of photostimulated luminescence, PSL, remaining after erasure) became $2.0 \times 10^{-4}$ times as much as the PSL (initial value) for the case where exposure to X-rays was immediately followed by excitation without application of erasing light. The smaller the value of this factor, the better.

To measure the required quantity of erasing light, the value of erasure must first be determined, as described below.

The first step in the measurement of the value of erasure is to measure the initial value. In this step, the sample is exposed to W (tungsten)-target 80 kVp X-rays for a dose of 1 mR. Then, the sample is irradiated with 4.3 J/m² of secondary exciting light from a semiconductor laser at a wavelength of 660 nm; the resulting PSL is passed through an optical filter and amplified by a photomultiplier tube to yield a luminescence $I_0$ (needless to say, if the same IP is to be used in the first step and in the second step that is described below, a sufficient quantity of light must be applied to perform erasure before the second step begins).

In the second step, the sample is exposed to W-target 80 kVp X-rays for a dose of 1000 mR and further irradiated with a specified quantity of erasing light (which is designated L (lux·sec)) under a fluorescent lamp. Then, the sample is irradiated with 4.3 J/m² of secondary exciting light from a semiconductor laser at a wavelength of 660 nm; the resulting PSL is passed through an optical filter and amplified by a photomultiplier tube to yield a luminescence $I_s$.

From the results of the first and second steps, the value of erasure for the case where erasure was performed with the quantity of erasing light L (lux·sec) is calculated as $I_s/I_0/1000$.

In the next step, the above-described procedure is repeated to determine the value of erasure with the quantity of erasing light L (lux·sec) being varied in small increments. From the obtained result (the constructed curve in a graph), the quantity of erasing light L required to attain a desired value of erasure is determined by back calculation. For the purpose of final evaluation of each of the phosphor layer samples having different relative densities, the quantity of erasing light determined by the above procedure is preferably as small as possible. This is also true in the case where evaluation is based on the value of erasure effected with a constant quantity of erasing light.

Turning back to FIG. 2, for the samples of phosphor layer having relative densities in the range of 50%-90%, it can be seen that at relative densities of 60% and below, the relative sensitivity drops to about 60-50% of the ideal 100%.

As for the quantity of erasing light, a preferred state is obtained at relative densities of 80% and below, namely, the quantity of erasing light can be held low. This is probably because at low relative densities, the erasing light enters the gaps between columnar crystals 14a to perform erasure not only from the surface of the phosphor layer but also from the side of each columnar crystal.

Considering these points, in the case of a radiation image conversion panel of the same type as the IP of the present invention which has a phosphor layer formed by a vapor-phase deposition method, it bears great importance to make such adjustments that the phosphor layer has a columnar crystal structure and that the columnar crystal structure accounts for 50 to 65% of the phosphor layer in terms of relative density.

On the following pages, specific examples of the present invention as well as comparative examples are described but they should not be taken to limit the present invention.

In the following examples and comparative examples, aluminum plates 1 mm thick were employed as substrates on which phosphor layers having different relative densities were formed with the pressure of Ar gas being varied in a vacuum deposition apparatus.

In the first step, the substrate was set on a substrate holder in the vacuum deposition apparatus. A CsBr evaporation source and a $EuBr_2$ evaporation source were loaded in resistance heated crucibles in the apparatus. The distance between the substrate and each evaporation source was adjusted at 150 mm.

In the next step, the main evacuation valve was opened to reduce the pressure in the chamber to $1 \times 10^{-3}$ Pa. Thereafter, the main evacuation valve was closed and the bypass evacuation valve was opened to introduce Ar gas into the chamber so that the internal pressure was increased to 0.8 Pa. Subsequently, a plasma generator (ion gun) was activated to generate plasma to clean the substrate surface.

Thereafter, the main evacuation valve was reopened to reduce the internal pressure to $1 \times 10^{-3}$ Pa and then closed; the bypass evacuation valve was opened again to introduce Ar gas into the chamber to lower the degree of vacuum to a value between 0.7 and 1.5 Pa (in terms of the pressure of Ar gas). By thusly changing the pressure of Ar gas over the range of 0.7 to 1.5 Pa in the process of film deposition, samples of phosphor layer were obtained at different relative densities (see Table 1 below).

TABLE 1

| Ar pressure | Relative density (%) | Section |
| --- | --- | --- |
| 1.5 | 50 | Example 1 |
| 1.25 | 60 | Example 2 |
| 1.2 | 65 | Example 3 |
| 1 | 80 | Comparative Example 1 |
| 0.7 | 90 | Comparative Example 2 |

EXAMPLE 1

With the pressure of Ar gas adjusted at 1.5 Pa, film deposition was carried out in order to form a phosphor layer having a relative density of 50%.

To be more specific, the respective evaporation sources were heated to melt by means of the associated resistance heaters, with the shutter between the substrate and each evaporation source remaining closed; thereafter, the shutter facing the CsBr evaporation sources was opened and a CsBr phosphor material was deposited on the substrate surface to form an undercoat layer. Three minutes later, the shutter facing the $EuBr_2$ evaporation sources was also opened and a CsBr:Eu stimulable phosphor layer was deposited on the undercoat layer.

The electric currents flowing through the respective resistance heaters were controlled so that the Eu/Cs molarity ratio in the stimulable phosphor was 0.003/1. After the end of evaporation, the pressure inside the apparatus was restored to one atmosphere and the substrate was taken out of the apparatus.

The undercoat layer on the substrate was covered with a stimulable phosphor layer (thickness: 500 μm; area: 10 cm×10 cm) having such a structure that columnar crystals of phosphor stood at very close spacings in a substantially vertical direction. The thus formed stimulable phosphor layer had a relative density of approximately 50%.

EXAMPLES 2 AND 3

With the pressure of Ar gas adjusted at 1.25 Pa and 1.2 Pa, film deposition was carried out in order to form phosphor layers having relative densities of 60% and 65%.

All other conditions were the same as in Example 1.

The thus formed stimulable phosphor layers had relative densities of approximately 60% and 65%.

COMPARATIVE EXAMPLES 1 AND 2

With the pressure of Ar gas adjusted at 1 Pa and 0.7 Pa, film deposition was carried out in order to form phosphor layers having relative densities of 80% and 90%.

All other conditions were the same as in Example 1.

The thus formed stimulable phosphor layers had relative densities of approximately 80% and 90%.

As described above, the phosphor films were formed that comprised columnar crystals whose average diameter was 8 μm and which had relative densities of 50-65%. Using those films, the relative sensitivity and the value of erasure were determined in accordance with the procedures already described. In a similar way, the comparative phosphor films were formed having relative densities of 80 and 90% and measured for the relative sensitivity and the value of erasure.

The results of measurements are shown in Table 2 below.

TABLE 2

|  | Composition of phosphor layer | Relative density (%) | Quantity of erasing light ($\times 10^4$ lux · sec) |
| --- | --- | --- | --- |
| Example 1 | CsBr:Eu | 50 | 7 |
| Example 2 | CsBr:Eu | 60 | 8 |
| Example 3 | CsBr:Eu | 65 | 10 |
| Comparative Example 1 | CsBr:Eu | 80 | 25 |
| Comparative Example 2 | CsBr:Eu | 90 | 70 |

In Table 2, the sample of Example 1 having a relative density of 50% was somewhat low in relative sensitivity but it is a preferred sample in that the quantity of erasing light could be suppressed at an extremely low level. The samples of Examples 2 and 3 having relative densities of 60% and 65%, respectively, both required somewhat larger quantities of erasing light than the sample with a relative density of 50% but those values were in a reasonably practical range and, combined with the enhanced relative sensitivities, were found to assure good feasibility.

The sample of Comparative Example 1 having a relative density of 80% had an even higher relative sensitivity than the sample of Example 3 having a relative density of 65% but, at the same time, it required a considerably larger quantity of erasing light, which is not necessarily preferred for the purposes of the present invention; the sample of Comparative Example 2 having a relative density of 90% required such a large quantity of erasing light that it was far from featuring good feasibility.

From these results, the relative density of the phosphor layer in the radiation image conversion panel of the present invention is determined to be such that the lower limit is 50% in order to assure high enough relative sensitivity whereas the upper limit is 65% in order to hold the required quantity of erasing light at low enough level.

As described on the foregoing pages, the IP of the present invention has good erasure characteristic, so it offers a marked advantage in that the energy remaining in the IP that has passed through a cycle of recording and reading steps can be erased with a small enough quantity of erasing light in a shorter period of time and at lower cost.

The embodiment described above is just one case of the present invention and is by no means intended to limit the same; it should be understood that various modifications and improvements can of course be made without departing from the scope and spirit of the invention.

What is claimed is:

1. A radiation image conversion panel comprising:
   a substrate; and
   a phosphor layer formed on said substrate by a vapor-phase deposition method,
   wherein said phosphor layer has a columnar crystal structure and said columnar crystal structure accounts for 50 to 65% of said phosphor layer in terms of relative density,
   wherein said relative density (%)=M2/M1×100, where
   M1(g)=weight of the phosphor layer=product of volume occupied by the phosphor layer (including voids) and the inherent density of the phosphor, and
   M2(g)=actual weight of the phosphor layer.

2. The radiation image conversion panel according to claim 1, wherein said phosphor layer is formed of an alkali metal halide based stimulable phosphor.

3. The radiation image conversion panel according to claim 2, wherein said alkali metal halide based stimulable phosphor is a cesium halide based stimulable phosphor.

4. The radiation image conversion panel according to claim 1, wherein said columnar crystal structure accounts for 50 to 60% of said phosphor layer in terms of relative density.

* * * * *